3,194,087
DRIVE SYSTEM FOR VEHICLES
Sven-Olof Kronogård, Goteborg, Sweden, assignor to Ab Volvo, Goteborg, Sweden, a corporation of Sweden
Filed Mar. 26, 1962, Ser. No. 182,224
Claims priority, application Sweden, Apr. 28, 1961, 4,483/61
7 Claims. (Cl. 74—661)

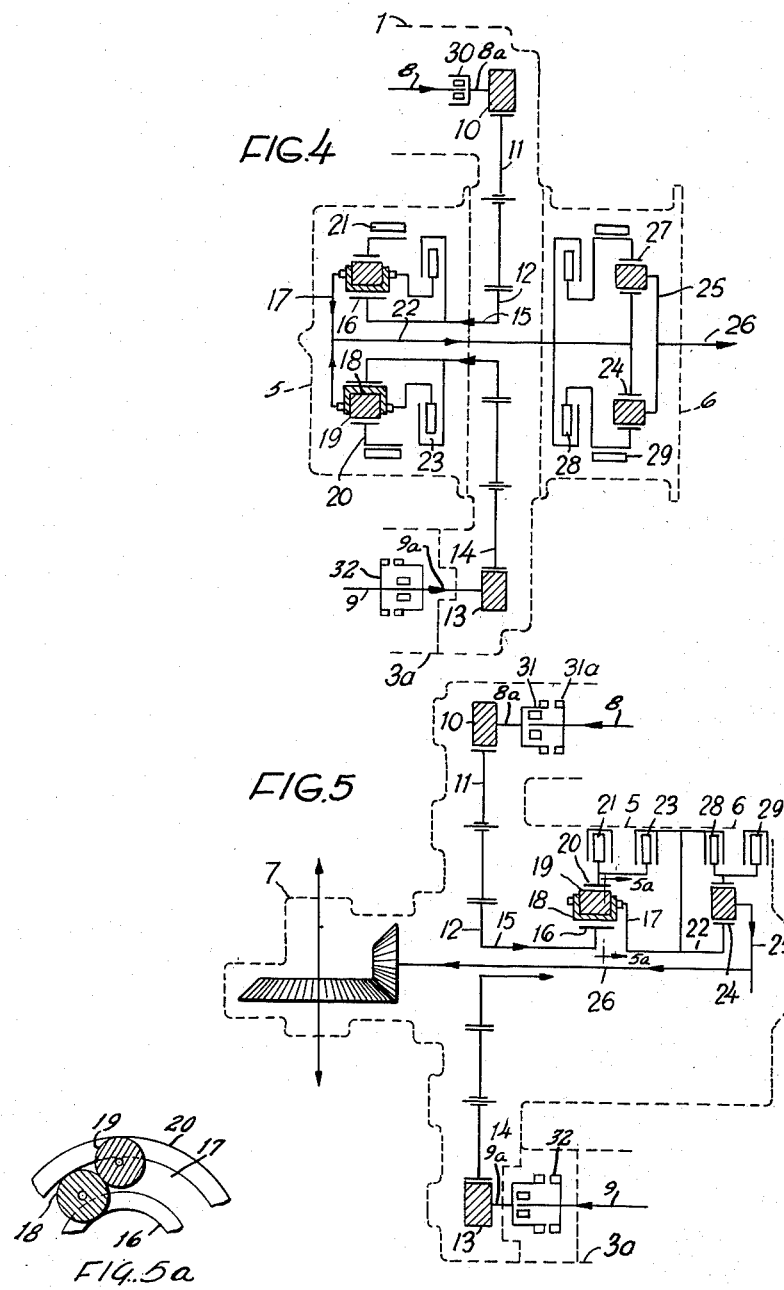

In certain types of motor vehicles and especially in cross-country vehicles it is sometimes necessary temporarily to increase the engine power to a very great extent. If for temporary cross-country travel there is required an engine power twice or perhaps many times as great as the power for running on a normal road it is not suitable, from the point of view of fuel consumption, to provide the vehicle with a single engine dimensioned for the required maximum power. In such case it is to be preferred to provide the drive system with two engines adapted to drive a common main output shaft. This is also suitable in so far as one of the engines can be used as an emergency engine permitting the vehicle to be driven in case of failure of the other engine. Further, a drive system comprising two small engines is often easier to put in place than a single large engine, especially in armoured cars where the available space for the drive system is considerably limited in certain directions.

This invention relates to a drive system for vehicles of the type referred to above, comprising two engines which drive a main output shaft via a collecting gear, and the system according to the invention is substantially characterized in that for each engine there is provided a disengageable clutch for disconnecting the engine from the collecting gear the output shaft of which is in turn disconnectible from the main shaft. Besides the possibility of putting the two engines in gear alternatively or simultaneously the drive system indicated results in the advantage that one engine can be started by means of the other one even if the vehicle is at a standstill. This is of particular importance if the normally used engine is a diesel engine. As is well known, diesel engines are difficult to start in very cold weather, but if the other engine is a gas turbine engine which is easy to start even in cold weather, it can be quickly started for starting the diesel engine.

Figure 1:
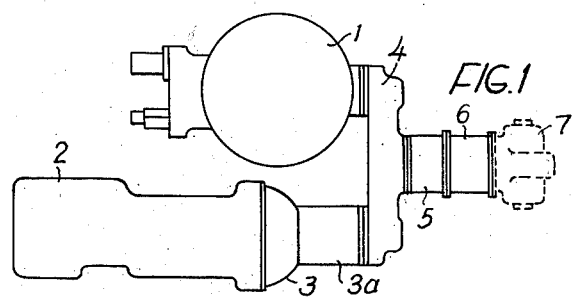
Figure 2:
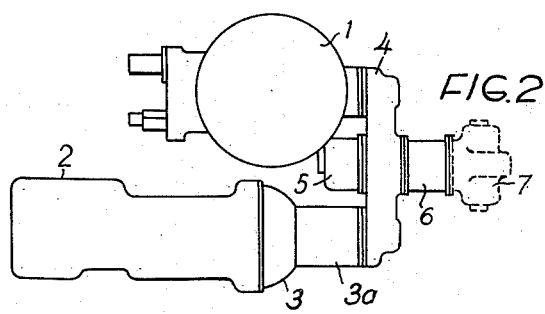
Figure 3:
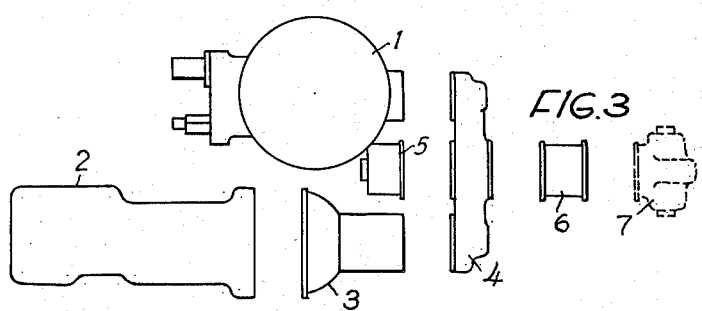

Additional features of the invention will appear from the following description of several embodiments of the invention illustrated in the annexed drawing. FIGS. 1 and 2 illustrate two different embodiments of the general arrangement of the various components of a drive system according to the invention. FIG. 3 is an exploded view of the components comprised in the system shown in FIG. 2. FIG. 4 is a diagrammatic view of the power transmission in a system according to FIGS. 2 and 3. FIG. 5 is a view similar to FIG. 4 of a modified power transmission, FIG. 5a is a cross section of FIG. 5 taken on line 5a—5a thereof.

It may be assumed that the drive system shown in FIGS. 1 and 2 are intended for the drive of armoured cars. Each system comprises a gas turbine engine 1 and a combustion engine 2 which preferably is a diesel engine. The diesel engine is provided with a hydrodynamic torque converter 3 having a successive mechanical gear 3a which may be stepwise variable. The two engines are connected to a collecting gear 4.

The two engines are placed side by side having their power take-off shafts extending in the same direction. In the embodiment shown in FIG. 1, the output shaft of the collecting gear 4 lies on the side of the collecting gear 4 opposite to the engines and is connected to a reverse gear 5 and a successive reduction gear 6 having a very high gear ratio, the reduction gear being in turn connected to a bevel gear 7.

In the embodiment shown in FIG. 2, the reverse gear 5 is located on the same side of the collecting gear 4 as the engines 1 and 2 and projects into the space therebetween. As a result, the length of the system is reduced and can be further reduced if the reduction gear, too, is placed between the engines so as to obtain a very compact structure.

FIG. 3 merely illustrates how the drive system is built up from separate, easily connectible components to facilitate assembling and disassembling of the drive system within the vehicle.

FIG. 4 illustrates the power transmission in a system according to FIG. 2. The output shaft 8 of the gas turbine engine 1 is connected through a disengageable clutch comprising a free-wheel device 30 to one collecting gear input shaft 8a that carries a pinion 10 which via an intermediate gear wheel 11 meshes with the central pinion 12 of the collecting gear 4. In a corresponding manner the diesel engine is connected to the input shaft of the hydrodynamic transmission and the output shaft 9 of the latter is connected through a disengageable clutch comprising a lockable free-wheel device 32 to the other collecting gear input shaft 9a and thence to the central pinion 12 via gear wheels 13 and 14.

The pinion 12 is mounted upon the tubular output shaft 15 of the collecting gear, which output shaft carries an input sun gear 16 of a reversing planetary gearing 5. Mounted on the planet carrier 17 of the planetary gear are two sets of planet wheels 18, 19 which are in mesh with each other as shown in FIG. 5a. The planet gear 18 meshes with the sun gear 16, and the planet gear 19 meshes with a ring gear 20 which constitutes the reaction element of the planetary gear and is associated with a brake 21.

The planet carrier 17 is mounted upon the output shaft 22 of the reverse gearing 5, said shaft extending through the tubular shaft 15 of the collecting gear and extending to the opposite side thereof. An engageable and disengageable clutch 23 is provided between the shaft 15 and the planet carrier 17.

The reduction gear 6, too, is a multi-step gear in the form of a planetary gear. The sun wheel 24 of this gear is mounted upon the output shaft 22 of the reverse gearing 5, and its planet carrier 25 is connected to the main output shaft 26 of the reduction gear. The ring gear 27 can be directly connected with the shaft 22 by means of an engageable and disengageable clutch 28. The ring gear 27 is also associated with a brake 29.

For the description of the mode of operation it may be assumed that the vehicle is travelling on a normal road and driven by the diesel engine 2 only. The gas turbine engine 1 is disconnected from the drive by means of the freewheel device 30. In the reversing gear 5 the clutch 23 is engaged and the brake 21 is released, resulting in that the entire gear will rotate as a unit and the output shaft 22 will rotate in the same direction and at the same speed as the shaft 15. In the high-ratio reduction gear 6 the clutch 28 is engaged and the brake 29 is released, also resulting in that the planetary gear will rotate as a unit and the main output shaft 26 will rotate in the same direction and at the same speed as the shaft 15 of the collecting gear. Different gear ratios can be adjusted in the gear unit 3, 3a associated with the diesel engine.

If the clutch 23 of the reverse gear 5 is disengaged and the brake 21 is applied, the output shaft 22 of this gear will rotate in opposite relation to the shaft 15 so as to establish reverse drive. If even in that case the shafts 15 and 22 are rotating at equal speeds, the operating conditions will be the same in forward and rearward drive.

If the clutch 28 of the high-ratio reduction gear 6 is disengaged and the brake 29 is applied the main output shaft 26 of the reduction gear will be driven at a lower speed than the shaft 22.

If in difficult cross-country conditions an increased power is desired, the gas turbine engine 1 is started without resulting in any variation of the flow of torque through the power transmission.

If, for instance in cold weather, it is desired to start the diesel engine by means of the easily started gas turbine engine, both the clutch 23 and the brake 21 of the reverse gear 5 are released with the result that the transmission of torque through the reverse gear will be entirely interrupted and the torque from the gas turbine engine will be transmitted to the diesel engine directly through the collecting gear 4, provided that the gear unit 3, 3a of the diesel engine is adjusted to permit transmission of torque to the diesel engine. As soon as the diesel engine has been started the gas turbine engine 1 can be stopped, if desired, which may be effected automatically.

In the embodiment according to FIG. 5 both the reverse gear 5 and the high-ratio reduction gear 6 are located on the same side of the collecting gear 4 as the engines. In FIG. 5 the various parts are designated by the same reference numerals as the correspondingly functioning elements of the embodiment according to FIG. 4. While in FIG. 4 the brakes 21 and 29 are illustrated in the form of band brakes, the brakes according to FIG. 5 are constituted by friction clutches. In the embodiment according to FIG. 5 the shaft 22 between the reverse gear and the reduction gear is tubular, and the clutch 23 of the reverse gear is inserted between the shaft of this gear and the ring gear 20, resulting in the same effect as the arrangement according to FIG. 4.

In most cases the gas turbine engine 1 is of the so-called free-turbine type comprising separate useful power and compressor turbines. In such an assembly the compressor input is not materially affected by the speed variations which may occur in operation of the vehicle. However, this type of gas turbine engine requires a separate starting device. If, on the other hand, the gas turbine engine is of the one-shaft type with combined useful power and compressor turbines and if the freewheel device 30 in the embodiment according to FIG. 4 is replaced by a lockable freewheel device 31 according to FIG. 5, the diesel engine can be used for starting the turbine engine in which case the diagrammatically illustrated dog clutch 31a for locking the freewheel device has to be engaged.

It has been assumed that the gear unit 3, 3a of the diesel engine is of the type comprising a dog clutch or similar member, such as the previously mentioned lockable freewheel device 32, for relieving the engine of its load. Consequently, if for some reason the diesel engine should fail it can be disconnected and the vehicle can be driven by the gas turbine engine only.

While the embodiments described comprise a piston engine and a gas turbine engine, the invention may equally well be applied to cases where both engines are either piston engines or gas turbine engines. However, a diesel engine is economic in operation and consequently suitable for normal driving conditions. To the contrary, very high demands regarding economy need not be made upon the more or less temporarily engaged auxiliary engine, whereas this engine is required to deliver a high power. Therefrom it follows that the gas turbine engine is highly suitable as the other engine, since it is possible without paying special regard to high efficiency to provide a very simple and inexpensive gas turbine power plant of high power and low weight and small dimensions. For certain ranges of application the piston or reciprocating engine need not be associated with a hydrodynamic torque converter. Instead, a mechanical gear box may be inserted between the engine and the collecting gear, which gear box may be disconnected and may or may not be provided with a hydraulic coupling. While the additional gear is illustrated in the drawings in the form of a high-ratio reduction gear arranged in series after the reverse gear, additional gears of other types may be used depending on the field of application etc., preferably of the two-step or multi-step type permitting the speed to be increased and/or decreased.

The invention is not limited to the embodiments illustrated and described, but may be modified within the scope of the appending claims.

What I claim is:

1. A drive system for vehicles, comprising in combination a pair of engines each having an output shaft, one of said engines being an internal combustion engine of piston type, a hydrodynamic transmission having input and output shafts, the input shaft of said transmission being connected to the output shaft of said internal combustion engine, the other engine being a gas turbine, a collecting gear having two input and one output shafts, disengageable clutch means comprising free-wheel devices connecting the output shaft of said hydrodynamic transmission and the output shaft of said turbine, respectively, to the input shafts of said collecting gear, a main output shaft connectible to a load, and gear means including disengageable clutch means connecting the output shaft of said collecting gear to said main output shaft.

2. A drive system according to claim 1, in which said gear means comprises a reverse gear.

3. A drive system according to claim 2, in which said reverse gear comprises a sun gear connected to said output shaft of the collecting gear, a ring gear and a planetary carrier supporting sets of planetary gears, each of said sets consisting of two gears being in mesh with each other and with the ring gear and the sun gear, respectively, and disengageable means for connecting the planetary carrier with the sun gear and holding the ring gear stationary, respectively.

4. A drive system as claimed in claim 2, and further comprising a multi-step gear arranged between said reverse gear and said main output shaft.

5. A drive system according to claim 4, in which said multi-step gear is located on the same side of said collecting gear with respect to said reverse gear.

6. A drive system according to claim 4, in which said multi-step gear is located on the opposite side of the collecting gear with respect to the reverse gear.

7. A drive system according to claim 4, in which said multi-step gear comprises a sun gear connected to the planetary carrier of said reverse gear, a planetary carrier connected to said main output shaft, planetary gears and a ring gear, and disengageable means for connecting said sun gear with said ring gear and holding said ring gear stationary, respectively.

References Cited by the Examiner
UNITED STATES PATENTS

| | | | |
|---|---|---|---|
| 2,132,450 | 10/38 | Wolf | 74—661 |
| 2,306,953 | 12/42 | Jung | 60—6 |
| 2,780,114 | 2/57 | Breuer et al. | 74—661 |

DON A. WAITE, *Primary Examiner.*

BROUGHTON G. DURHAM, *Examiner.*